Nov. 14, 1950　　　H. T. JENSEN ET AL　　　2,529,610
CENTRIFUGAL CLUTCH
Filed Jan. 15, 1946
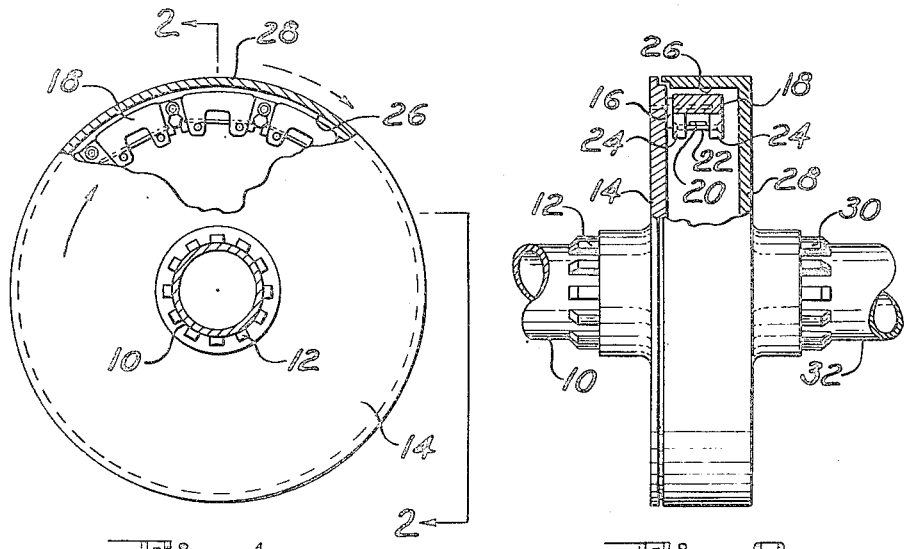
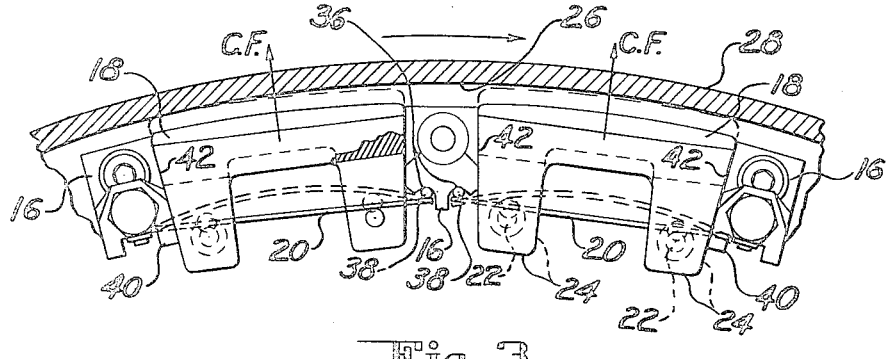
FRITZ E. HILLER
H. T. JENSEN
INVENTORS
BY *Gifford S. Holmes*
AGENT Patented Nov. 14, 1950

2,529,610

UNITED STATES PATENT OFFICE 2,529,610

CENTRIFUGAL CLUTCH

Harry T. Jensen, Milford, and Fritz E. Hiller, Stratford, Conn., assignors to United Aircraft Corporation, East Hartford, Conn., a corporation of Delaware Application January 15, 1946, Serial No. 641,397

3 Claims. (Cl. 192—105)

This invention relates to improvements in centrifugal clutches, and more particularly to an arrangement therein of spring biased shoes having improved operating characteristics, whereby the life of the clutch shoes and elements associated therewith is increased many times over presently known structures.

More specifically, the improved clutch shoe operating mechanism includes a leaf spring mount which provides a given degree of motion of operation of the clutch shoes, which spring mount also provides a substantially uniform spring rate.

In accordance with the above, it is an object of this invention to provide an improved centrifugal clutch comprising a novel spring mount and shoe arrangement for cooperation with a torque transfer surface.

Other objects and advantages lie in the details of construction and arrangement of parts of this improved centrifugal clutch and will be either obvious or pointed out in the following specification and claims as interpreted in view of the accompanying drawing of a presently preferred embodiment, in which:

Fig. 1 is an elevational view of the clutch within a casing having a portion broken away to show the operating structure within;

Fig. 2 is a side elevational view with parts in section as indicated by the lines 2—2 of Fig. 1; and Fig. 3 is an enlarged view showing the details of construction of the operating elements within this clutch.

Referring in detail to the drawings, and first to Figs. 1 and 2, a drive shaft 10 (which may connect with an engine or the like) carries upon splines 12 a disc 14 which mounts abutments or posts 16 on one side adjacent its periphery. The posts mount friction shoes 18 upon leaf springs 20 retained by pins 22 in ears 24 of the shoes 18. When the disc 14 is rotated, the shoes 18 are urged outwardly by centrifugal force to bend the springs to such an extent that the outermost curved surfaces of the shoes 18 will engage an inner curved surface 26 of a driven bell 28 that is mounted upon splines of an output shaft 32, to thus drive the bell 28 by frictional transfer of torque.

As best shown in Fig. 3, the leaf springs 20 pass between the pairs of ears 24 and are held in place by pins 22, one of which extends through each pair of ears and bridges the space therebetween. The ends of leaf springs 20 overlies shoulders on the posts 16, which shoulders are provided with grooves 36 which mount cylindrical or roller bearings 38 upon which the ends of springs 20 bear in their active position under the influence of centrifugal force. The tension of each spring holds the shoes 18 into engagement with diverging surfaces 42 of the posts 16. Securing clips 40 abut the sides of the springs adjacent their ends and the ends of rollers 38 to retain the springs and rollers in the assembled position shown. Under the influence of centrifugal force the springs 20 will bend into the dotted line position (Fig. 3) and the shoes 18 will move outwardly toward the torque transfer surface 26 on the inside of the driven bell 28. Upon contacting the surface 26, the shoes 18 will engage the angled side surfaces 42 of the posts 16, so that torque is transferred from the surface 42 to the surface 26 by the shoes 18.

With the springs 20 mounted as described above between the pins 22 carried by the shoes 18 and the rollers 38 carried upon the surfaces 36, it has been found that the change in spring tension is substantially at a uniform rate for the entire travel of the shoes 18, even when the engaging surfaces are worn. To further increase the life of the shoes 18, it has been found advantageous to preload the springs 20 so that when the surfaces 42 are engaged by the sides of the shoe, the spring 20 will be bowed (or deflected). By such expedient, the spring 20 may be of a relatively lower rate than in hitherto known structures so that in the active range of travel of the shoe, a large amount of wear may occur on the torque transfer surface without substantially varying the number of revolutions per unit of time required to cause engagement of the shoes 18 with the torque transfer surface 26.

As one practical example of the use of such a shoe, which example is for purposes of illustration only and not to be construed in a limiting sense, by placing the spring mounts with a lower spring rate spring than heretofore used in the manner disclosed above, the life of the friction shoes 18 was increased by substantially 1200 percent. In this case, the springs 20 had a spring rate of approximately 1186 pounds per inch of deflection, the weight of each shoe was approximately .288 pound, the normal travel through the operating range for normal wear of the shoe was .105 inch, and distance between the pins 22 was 1.32 inches and the distance from each pin 22 to each roller 38 was .420 inch. The torque transfer per shoe was substantially 58 inch pounds and the radius of the point of the center of gravity of each shoe from the center of rotation of the driving member 14 was approximately 9.65 inches and the revolutions per minute to transfer torque was 1400 R. P. M. For greater torque transfer, it is only necessary in this device to provide additional shoes and mounts therefor. It has been found advantageous to use an even number of shoes with equal numbers of shoes arranged on opposite sides of the driving member 14 so that the total centrifugal force of the driving member 14 is concentrated at the center of the shaft 10. If an odd number of shoes is to be used, these may be spaced in such a manner that the resultant of the centrifugal force is located on the axis of the shaft 10.

While we have shown and described one specific embodiment of this invention, obviously modifications thereof will occur to those skilled in the art. For this reason, we wish not to be limited in our invention only to that form shown and described in detail but by the scope of the following claims:

We claim:

1. In a centrifugal clutch, a driving member, a driven member, a centrifugally operated shoe rotated by said driving member for transmitting torque by friction to said driven member, a leaf spring supported by a pair of abutments on said shoe in a position transverse to a radius of said clutch with said abutments bearing at spaced points on a face of said spring intermediate the ends of the latter and in a direction to move said spring with said shoe toward the periphery of the clutch, and means for providing a virtually straightline deflection curve for said spring including a second pair of abutments carried by said driving member engaging said spring on the opposite face thereof from said first-mentioned abutments and opposing the aforesaid movement of said spring by said shoe, each of said second pair of abutments being located nearer the end of said spring than the corresponding abutment of said first pair and also having a line bearing on said spring transverse to the length of the latter spaced inwardly from the adjacent end thereof and having a support on said driving member which remains a fixed distance laterally from the adjacent abutment on said shoe throughout the entire flexing movement of said spring.

2. In a centrifugal clutch, a driving member, a driven member, a centrifugally operated shoe rotated by said driving member for transmitting torque by friction to said driven member, a leaf spring supported by a pair of spaced abutments on said shoe in a position transverse to a radius of said driving member, said abutments being located on the side of said spring and remote from the ends thereof, whereby said spring is urged toward the periphery of the clutch by centrifugal forces acting on said shoe, and means for providing a constant deflection curve for said spring throughout its range of movement including a second pair of abutments carried by said driving member and engaging said spring on the opposite face thereof from said first-mentioned abutments and opposing the aforesaid movement of said spring, said second pair of abutments being located nearer the ends of said spring than said first-mentioned pair and between the latter and the ends of said spring and comprising rollers extending across the face of said spring and which are mounted in laterally fixed position on said driving member relative to the abutments on said shoe throughout the entire travel of said spring during flexure.

3. In a centrifugal clutch of the character described, in combination, a driving member, a driven member, a plurality of pairs of spaced abutments not less than 12 on said driving member, each pair having radially diverging surfaces which form an included angle of not more than 30°, a plurality of friction shoes each having opposite radial abutment surfaces adapted for engaging said diverging surfaces and a torque transfer surface for engaging and driving said driven member, a floating leaf spring mounting each of said shoes located between each of the pairs of diverging surfaces of said driving member, and means carried by said driving member for supporting said springs against centrifugal forces acting to urge said shoes into driving engagement with said driven member and providing a constantly variable spring force throughout the travel of said springs, said means comprising spring supporting abutments on said driving member disposed transversely of said springs adjacent opposite ends thereof and having line contact with said springs and means for holding said spring supporting abutments in fixed spaced relation so that the lines of engagement of each spring with its supporting abutments remain constantly spaced laterally relative to each other throughout the deflecting movement of said springs.

HARRY T. JENSEN.
FRITZ E. HILLER.

REFERENCES CITED

The following references are of record in the file of this patent:

UNITED STATES PATENTS

| Number | Name | Date |
|---|---|---|
| 258,472 | Radford | May 23, 1882 |
| 1,727,467 | Johnson | Sept. 10, 1929 |
| 1,733,703 | Uggla et al. | Oct. 29, 1929 |
| 1,819,830 | Wersall | Aug. 18, 1931 |
| 1,870,649 | Rawson | Aug. 9, 1932 |
| 2,429,697 | Rawson | Oct. 28, 1947 |
| 2,456,942 | Holbrook | Dec. 21, 1948 |